United States Patent Office.

GEORGE A. MARINER, OF CHICAGO, ILLINOIS, ASSIGNOR TO HIMSELF AND JOHN B. TURCHIN, OF SAME PLACE.

Letters Patent No. 78,112, dated May 19, 1868.

IMPROVED PRESERVING-POWDERS.

The Schedule referred to in these Letters Patent and making part of the same.

TO ALL WHOM IT MAY CONCERN:

Be it known that I, GEORGE A. MARINER, of the city of Chicago, in the county of Cook, and State of Illinois, have invented certain new and useful "Preserving-Powders;" and I do hereby declare that the following is a full, clear, and exact description thereof.

To enable others skilled in the art to make and use my invention, I will proceed to describe it.

The object of my invention is to provide cheap, convenient, practical, and effective means for the generation of free sulphurous acid, for general application, but more particularly for the preservation of animal and vegetable perishable substances from fermentation and putrefaction; and the nature of the invention consists in the production of certain powders, composed of such ingredients, that when exposed to the air, or moistened by water, or by the juices or moisture contained in substances treated, or when dissolved in liquids containing said substances, or associated with hygroscopic or deliquescent absorbents, said ingredients would generate the free sulphurous-acid gas, and form neutral mineral or vegetable salts, of such a nature, that when said powders are used by direct application to and with animal or vegetable substances destined for food, said neutral salts thus formed would not be injurious to health.

The powders consist of sulphites, bisulphites, or hyposulphites mixed in equivalent proportions with vegetable or mineral acids, or vegetable or mineral acid salts. Out of the first constituents, the sulphites or bisulphites of soda or lime are preferable, although any of the sulphites, bisulphites, or hyposulphites of potassa, ammonia, or magnesia, &c., or any compound evolving sulphurous-acid gas, when acted upon by acids or acid substances, may be used. For the second constituents, out of vegetable substances, the tartaric or citric acid, or the acid tartrates or citrates are preferable, though other vegetable acids or acid salts may be used, such as the oxalic acid and acid oxalates, or the malic acid and acid malates, the latter being particularly useful in those applications where a hygroscopic or deliquescent action is desirable. The desiccated juices of various fruits, vegetables, &c., may also be used. Among mineral acid salts, the acid sulphates of soda, potassa, or ammonia are preferable, though the acid phosphates of soda, potassa, ammonia, or lime, or others may be used. Mineral acids, and particularly phosphoric, are used when the strongest hygroscopic or deliquescent action and the most rapid liberation of sulphurous acid are required; they being made available by being first mixed with starch, flour, or other absorbent substances.

When it is intended that the powders when in use shall spontaneously evolve sulphurous acid more or less rapidly by a more or less rapid absorption of moisture, that effect is attained by selecting for acid constituents those acid substances which are attractive of moisture, such as the phosphoric, citric, or malic acids, the acids, malates, or phosphates, &c., or it may, in certain cases, be attained by adding to the powders, or to the article to be treated, any hygroscopic or deliquescent substances, such as the chlorides of zinc, calcium, or sodium, &c., or the desiccated vegetable extracts or juices.

In the preparation of the above-described powders, the selection of materials or ingredients is influenced by the particular application intended. When general domestic use or the preservation of food is the object, hygienic and nutritious qualities are the most important, and in this case I prefer to use dry pulverized tartaric acid, mixed in equivalent proportions with the dry, finely-divided sulphites of soda or lime; but when a more gradual and spontaneous action is desired, I replace the tartaric acid partly or entirely in the above-said combination by the citric acid. In most other applications, however, economy and efficiency being most to be considered, I use, in preference, the bisulphites of soda or potassa, in combination with the sulphates of lime or soda, adding chloride of calcium, or chloride of zinc, when a gradual self-sustaining action is desirable.

The powders, when prepared, are in all cases to be preserved in a dry state for use, by enclosing them in air-tight vessels or packages. The vessels or packages may be arranged so as to keep the ingredients separate, if desirable, until the time comes for the use of the powders, when said separated ingredients are mixed or used one after another. I always prefer, however, to put up the ingredients in separate vessels or packages, or in the same vessel or package, but partitioned, when said ingredients are of such a nature that when mixed they react upon each other so energetically as to produce a spontaneous generation of gas. In this case, the ingredients must be mixed when the powders are to be used.

In order to give a basis for the quantity of the sulphurous-acid gas generated by a certain quantity of powders, I will take, as an example, the powders consisting of sulphite of soda, or sulphite of lime, and tartaric acid, mixed in chemical equivalents. In the first instance, four and four-fifths grains of sulphite of soda, and four and four-fifths grains of tartaric acid, or nine and three-fifths grains of powders, produce one grain of sulphurous acid. In the second instance, two and a half grains of sulphite of lime, and five grains of tartaric acid, producing seven and a half grains of powders, give one grain of sulphurous acid; the quantity of powders composed of other ingredients necessary to produce one grain of said gas varying, according to the difference in weight of different chemical equivalents. The one grain of gas thus produced, and practically applied, may be concentrated in a small space, or disseminated through a large space, according to the effects desirable to obtain, and the delicacy or nature of the articles treated. The sulphurous-acid gas, being known as a potent agent for the preservation of animal and vegetable substances, by destroying animal and vegetable germs, constituting the cause of fermentation and putrefaction, must be used judiciously, when applied in practice, a mere trace of it being sufficient sometimes to produce the desirable effect.

The substances treated by the powders have to be enclosed in air or water-tight vessels, when intended for preservation, and if otherwise, the quantity of the gas supplied must be proportionately more abundant. The powders are equally applicable to raw, or to partially or entirely-cooked substances, or to substances prepared in some other way, or cured, or preserved, all of which substances are treated by direct application of or mechanical mixture with the powders, or by being exposed to the effect of the gas generated by the said powders. And the so-treated or preserved substances, when intended for food, after being taken out of the vessels for use, are exposed to the air, or slightly heated, or sifted, or worked up and stirred, according to their nature, when the sulphurous-acid gas escapes, and the neutral salts formed of the ingredients of said powders and remaining, are separated from said substances, or, if of the same nature as the salts contained by the substances themselves, are left with said substances.

The above-described powders are intended to be used in all cases where sulphites, or burnt sulphur, or free sulphurous-acid gas have been or are used, embracing also the cases in which the modes or apparatus already used for the application of the said gas practically, are inapplicable. And the advantages of the powders in their practical application, whether it be in the preservation of perishable substances or beverages, or in arts and manufactures, such as anatomical preparations, manufacture of sugar, treating skin-diseases in medicine, disinfection of sewers, cesspools, &c., or in bleaching textiles and materials, or in preservation of corpses, and other instances, consist in the simplest, the most convenient, and the cheapest mode of generating, and at the same time applying the sulphurous-acid gas to various uses in its free and nascent state, filling any space with said gas in any degree of concentration, and under any pressure, and even, by using suitable vessels and a sufficient quantity of powders, liquefying the said gas, if necessary, under a low temperature; and as regards food, the powders do not communicate to it any unpleasant taste, and do not injure it in any way, the escaped gas leaving no traces in it, and the salts left or mixed with it being not injurious to health.

Having thus fully described the composition of my powders, their application and advantages, and being aware that the sulphurous-acid gas has been and is used for different purposes, and that sulphites have been and are used for preservation of various substances, what I claim as my invention, and desire to secure by Letters Patent, is—

The powders, composed of sulphites, bisulphites, or hyposulphites, or any compound evolving the sulphurous-acid gas, when acted upon by acids or acid substances, in combination with vegetable or mineral acids, or with vegetable or mineral acid salts, or desiccated vegetable juices, with or without the absorbents herein specified, for the purpose of generating the sulphurous-acid gas, and applying the same to various uses, substantially as and in the manner herein set forth and specified.

GEORGE A. MARINER.

Witnesses:
J. B. TURCHIN,
J. R. MARTIN.